United States Patent
Lesage

(10) Patent No.: US 12,288,487 B2
(45) Date of Patent: Apr. 29, 2025

(54) MODULAR TILE ELEMENT

(71) Applicant: Aluvision N.V., Deinze (BE)

(72) Inventor: Michiel Lesage, Kuurne (BE)

(73) Assignee: Aluvision N.V., Deinze (BE)

( * ) Notice: Subject to any disclaimer, the term of this patent is extended or adjusted under 35 U.S.C. 154(b) by 0 days.

(21) Appl. No.: 17/769,065

(22) PCT Filed: Oct. 16, 2020

(86) PCT No.: PCT/IB2020/059763
§ 371 (c)(1),
(2) Date: Apr. 14, 2022

(87) PCT Pub. No.: WO2021/074880
PCT Pub. Date: Apr. 22, 2021

(65) Prior Publication Data
US 2024/0105085 A1   Mar. 28, 2024

(30) Foreign Application Priority Data
Oct. 18, 2019 (BE) .................... 2019/5721

(51) Int. Cl.
*G09F 9/302* (2006.01)
*G09F 9/33* (2006.01)

(52) U.S. Cl.
CPC .............. *G09F 9/3026* (2013.01); *G09F 9/33* (2013.01); *G09F 9/335* (2021.05); *G09G 2300/026* (2013.01)

(58) Field of Classification Search
CPC .......... G09F 9/3026; G09F 9/33; G09F 9/335; G09G 2300/026; F16M 13/022; F16M 13/02
See application file for complete search history.

(56) References Cited

U.S. PATENT DOCUMENTS

| 8,935,867 B2 | 1/2015 | Patterson | |
| 2009/0284978 A1* | 11/2009 | Elliott | G09F 9/33 362/382 |
| 2009/0309494 A1* | 12/2009 | Patterson | G09F 9/33 445/24 |
| 2014/0003052 A1* | 1/2014 | Hemiller | H05K 7/14 362/249.02 |
| 2016/0034240 A1* | 2/2016 | Kreiner | G09F 9/3026 348/383 |

FOREIGN PATENT DOCUMENTS

| CN | 209133115 | 7/2019 |
| KR | 20190005890 | 1/2019 |

* cited by examiner

*Primary Examiner* — Brent D Castiaux
(74) *Attorney, Agent, or Firm* — MH2 Technology Law Group LLP

(57) ABSTRACT

Tile element for constructing a modular construction, the tile element comprising a chassis with a base body which has a visible side which is provided substantially wholly with an LED screen, wherein the base body comprises first connecting sides adjacently of a peripheral edge of the visible side, characterized in that the first connecting sides extend at an angle relative to the visible side and wherein the chassis further comprises edge bodies which can be connected to the base body in order to form, where the edge body is connected, a second connecting side which extends substantially perpendicularly of the visible side.

11 Claims, 7 Drawing Sheets

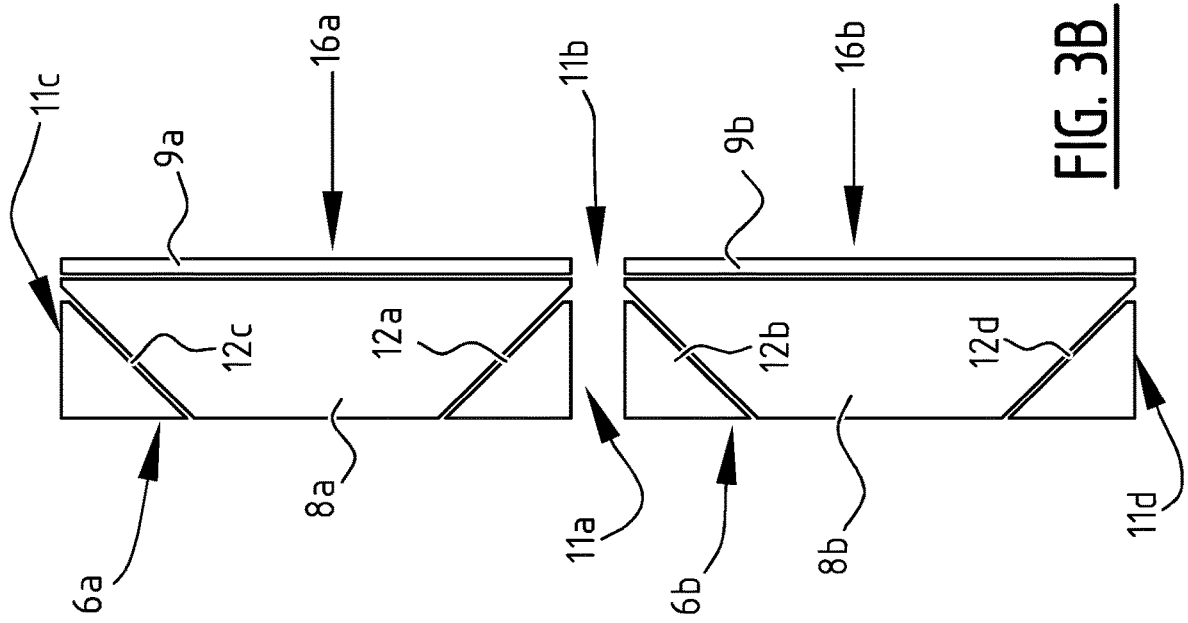
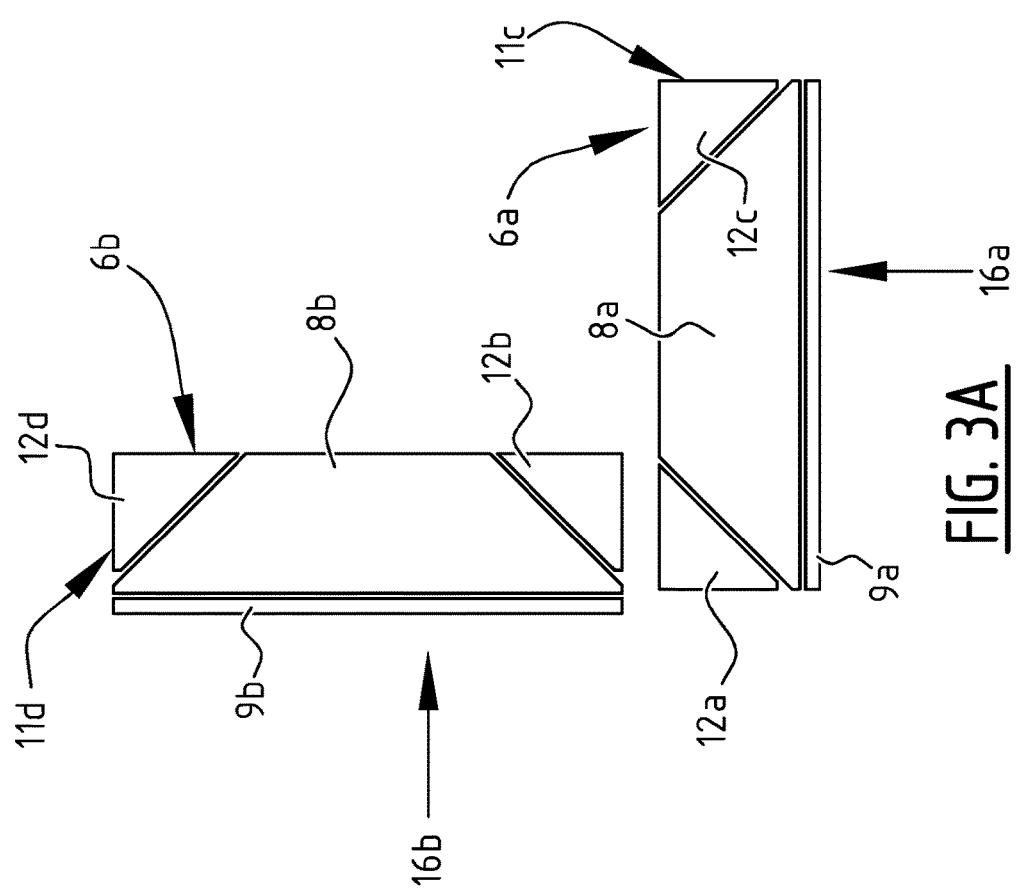

MODULAR TILE ELEMENT

The invention relates to a tile element for constructing a modular construction, the tile element comprising a chassis with a base body which has a visible side which is provided substantially wholly with an LED screen, wherein the base body comprises first connecting sides adjacently of a peripheral edge of the visible side.

Such a tile element is known from WO2018116101 and is used for exhibition stands. A tile element comprises LED screens, a frame and a signal receiver. The frame has a front face and four lateral faces on which fixing surfaces and installation holes are provided. Modular connections and quick assembly and disassembly are brought about by connecting means.

The invention relates particularly to a tile element for constructing modular constructions for exhibition booths, advertising constructions, structures used in the entertainment industry, for instance stages, and the like. Such modular constructions are preferably designed such that they can be constructed and dismantled in rapid and simple manner, can be transported compactly, and are light. It is further advantageous for the set of components to allow different shapes and sizes of construction to be built. The modularity implies a complementarity, extendibility and interchangeability of components in the construction. In other words, the modular construction implies that a varying and large number of shapes and dimensions of construction can be realized with a limited number of unique components. The invention relates particularly to a set of components in which LEDs are integrated.

The maximum width of the tile element, and the details of the corner element, depend on the manufacturer. The principles of construction on the basis of corner elements and tile elements are however almost always applied. When LED screens are integrated in an exhibition booth, this is typically done at the position of a surface. One or more tile elements are for this purpose provided at the position of a visible surface with an LED module. This LED module typically extends to the peripheral edges of the visible surface of the LED tile. This allows a plurality of LED tiles to be placed adjacently of each other, this creating the impression that the LED screen runs continuously from the one to the other LED tile. In other words, it creates the illusion that one large LED screen is provided in the wall. This LED screen is however constructed from a plurality of individual LED modules which are provided on the modular tiles which together give an integrated impression.

There is a commercial demand to integrate LED screens in a modular construction in more flexible manner. The commercial demand is more specifically to create the LED screen not in a single surface but over a plurality of surfaces, wherein the plurality of surfaces even lie at an angle, even relative to each other. In other words, the demand is, among other things, for an LED screen which extends over a corner of a construction, wherein the impression is created of one continuously running screen which extends over the corner of the modular construction.

In the construction of modular booths it is difficult to form corners. Particularly difficult is the technical realization of achieving that two surfaces which are positioned at an angle relative to each other are both provided with LEDs substantially into the corner. Solutions devised for this are detrimental to the modularity and interchangeability of components in the construction.

It is an object of the invention to provide a tile element with an LED screen whereby corners can be formed in simple manner and which has an improved modularity.

The invention provides for this purpose a tile element for constructing a modular construction, the tile element comprising a chassis with a base body which has a visible side which is provided substantially wholly with an LED screen, wherein the base body comprises first connecting sides adjacently of a peripheral edge of the visible side, characterized in that the first connecting sides extend at an angle relative to the visible side and wherein the chassis further comprises edge bodies which can be connected to the base body in order to form, where the edge body is connected, a second connecting side which extends substantially perpendicularly of the visible side.

Multiple advantages are achieved by providing the chassis of the tile element with a base body and edge bodies. When all edge bodies are connected to the base body, the tile element can be utilized as a straight tile, i.e. all connecting sides run perpendicularly of the visible surface. This allows the tile elements to be connected to each other so that their visible surfaces lie mutually line, parallel to each other, and thus form one visual surface. Depending on the position in the modular construction one or more edge bodies can also be omitted, whereby the first connecting sides can be used to connect adjacent tile elements. This allows the tile elements to be connected to each other so that an angle is formed between their visible surfaces. The LED screen continues here to a position substantially in the corner in both visible surfaces.

Because a selection can be made of edge bodies which can be connected and/or removed, it is possible to use the tile element according to the invention in a straight surface, a 2D corner, a 3D corner, a pillar, a cube and so on. A tile element with an LED screen is thus provided whereby corners can be formed in simple manner and which has an improved modularity. Tile elements of which opposite edge bodies have been removed can be applied in an outer arch, wherein the outer corner between the visible surfaces typically lies between 180 degrees and 270 degrees. In comparison, in a 2D corner the outer corner between the visible surfaces is 270 degrees and two surfaces lying mutually on line have an outer corner between the visible surfaces of 180 degrees. The outer arch can be oriented horizontally, vertically or at an angle. An outer arch wherein LED screens fit together well at the position of the corners cannot be realized with known tile elements. With the tile elements according to the invention an inner arch can also be realized, wherein the outer corner between the visible surfaces typically lies between 2 degrees and 180 degrees.

Particularly advantageous embodiments of a tile element according to the invention form the subject-matter of appended dependent claims and/or will become apparent from the figure description below.

The invention will now be further described on the basis of an exemplary embodiment shown in the drawing.

In the drawing:

FIG. 3 is a top view of a cross-section of two tile elements for coupling to each other;

The following detailed description relates to determined specific embodiments. The teaching hereof can however be applied in different ways. In this description reference is made to the drawings, in which the same components are designated everywhere with the same reference numerals.

The present invention will be described with reference to specific embodiments. The invention is however not limited thereto, but solely by the claims.

As used here, the singular forms "a" and "the" comprise both the singular and plural references, unless clearly indicated otherwise by the context.

The terms "comprising", "comprises" and "composed of" as used here are synonymous with "including". The terms "comprising", "comprises" and "composed of" when referring to stated components, elements or method steps also comprise embodiments which "consist of" the components, elements or method steps.

The terms first, second, third and so on are further used in the description and in the claims to distinguish between similar elements and not necessarily to describe a sequential or chronological order, unless this is specified. It will be apparent that the thus used terms are mutually interchangeable under appropriate circumstances and that the embodiments of the invention described here can operate in an order other than described or illustrated here.

Reference in this specification to "one embodiment", "an embodiment", "some aspects", "an aspect" or "one aspect" means that a determined feature, structure or characteristic described with reference to the embodiment or aspect is included in at least one embodiment of the present invention. The manifestations of the sentences "in one embodiment", "in an embodiment", "some aspects", "an aspect" or "one aspect" in different places in this specification thus do not necessarily all refer to the same embodiment or aspects. As will be apparent to a skilled person in this field, the specific features, structures or characteristics can further be combined in any suitable manner in one or more embodiments or aspects. Although some embodiments or aspects described here comprise some but no other features which are included in other embodiments or aspects, combinations of features of different embodiments or aspects are further intended to fall within the context of the invention and to form different embodiments or aspects, as would be apparent to the skilled person. In the appended claims all features of the claimed embodiments or aspects can for instance be used in any combination.

Figure 1:
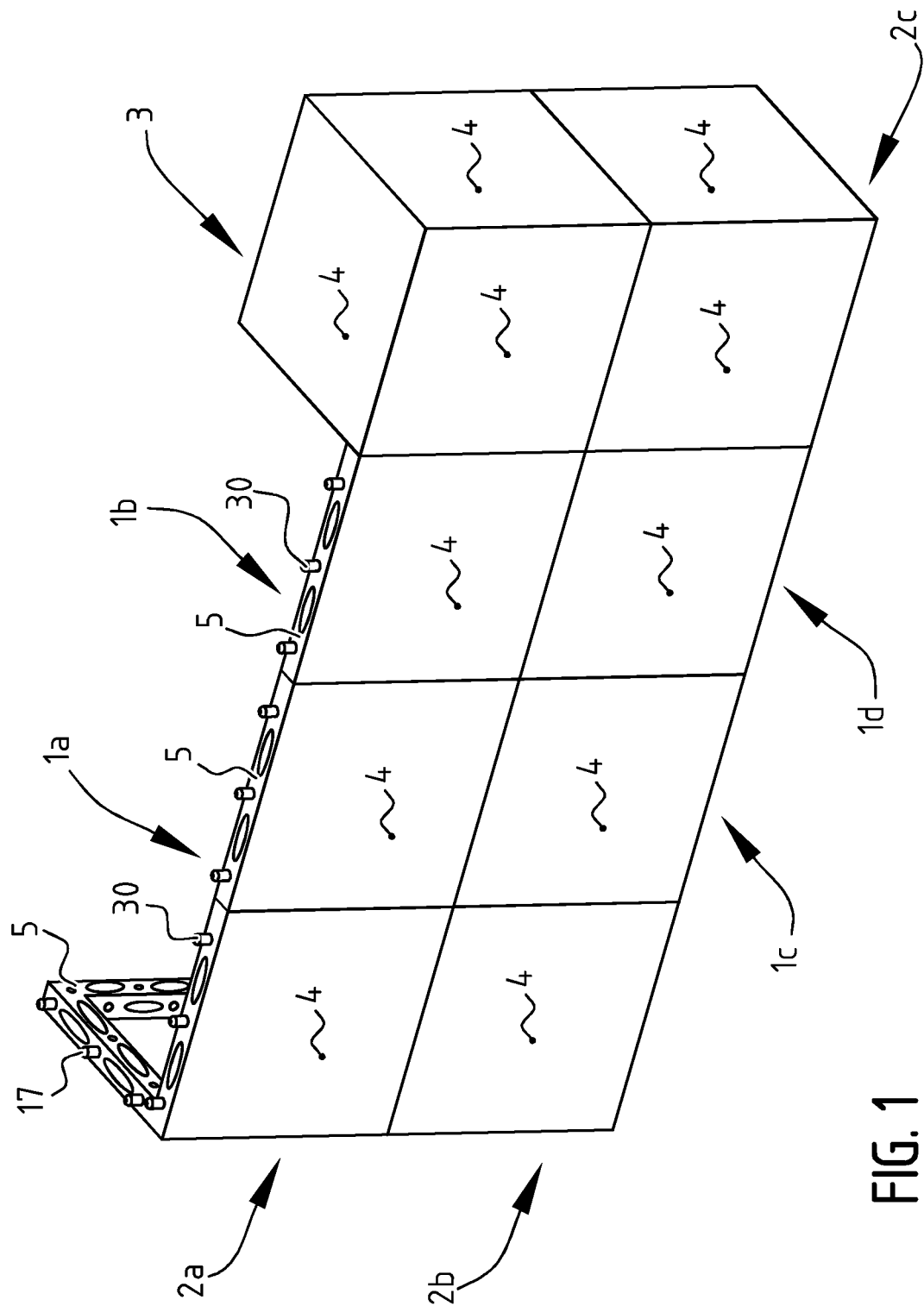
FIG. 1 is a perspective view of a known modular construction system.

FIG. 1 shows a known modular construction system which can be used in moveable and/or temporary structures. Examples of use for such a construction system are conventions, concerts, temporary buildings and so on. The known modular construction system comprises a plurality of mutually connected construction elements 1a-d, 2a-c, 3. The modular construction elements can be used to form different shapes, dimensions and appearances of the construction system depending on the application and/or the designer and/or the client. As shown in FIG. 1, the modular construction elements can for instance be used in the construction of a temporary wall, for instance for an exhibition booth at a trade fair.

The construction elements can take different forms. A first construction element is a one-dimensional, 1D, construction element 1a-d. In the context of the application a one D construction element is a construction element with one visible surface. A visible surface 4 is a surface of the construction element which is intended to be visible to a spectator when the construction element is set up, in other words, it is a visible side of the construction element. Visible surface 4 can be formed by for instance an LED module.

A second construction element is a two-dimensional, 2D, construction element 2a-c. The 2D construction element has two visible surfaces. The 2D construction element hereby forms a corner. More specifically, the construction element is formed to allow an LED screen to continue over a corner. In other words, two surfaces are placed at an angle relative to each other, wherein each surface comprises an LED screen extending substantially into the corner. With such a construction element corners can be formed.

A third construction element is a three-dimensional, 3D, construction element 3 with three visible surfaces. The 3D construction element forms a three-dimensional corner. More specifically, the construction element is formed to allow an LED screen to continue over a three-dimensional corner. In other words, three surfaces are placed at an angle relative to each other, wherein each surface comprises an LED screen extending substantially into the corner. With such a construction element three-dimensional corners can be formed, for instance in the case of a cube.

Further alternative construction elements (not shown) can be curved. A curved construction element is a construction element with a visible surface which has a curved form, for instance a rounded corner.

The construction element is provided with a frame 5 with connecting surfaces at the position of the edges of the construction element so as to be connected to adjacent construction elements and thus be integrated in the modular construction. The construction element can be connected to an adjacent construction element via connecting means 30 which are provided on the connecting surfaces. The connecting means typically comprise opposite, complementary components. Co-action of the complementary components or connecting means enables a plurality of construction elements to be connected to each other in simple manner and without tools.

The construction elements are integral elements which can be used in the construction of a modular construction system. 1D construction elements 1a, 1b, 1c and 1d can thus for instance be connected to each other via their frames 5 for the purpose of forming a wall.

For the purpose of forming an outer corner of the construction, 2D construction elements 2a, 2b can be connected to the 1D construction elements 1a, 1c. It will be apparent that the 2D construction elements 2a, 2b are also mutually connectable. One or more of said construction elements can further be connected to the free outer end of the outer corner.

A three-dimensional corner construction can alternatively be formed. In the illustrated example of FIG. 1 a 3D construction element 3 is for this purpose connected to the 1D construction element 1b. An adjacent 2D construction element 2c can optionally be connected to the 3D construction element 3. The 2D construction element can be connected to both the 1D construction element 1d and the 3D construction element 3. As indicated above, a further free outer end of the wall can be connected to a further construction element, for instance a curved construction element (not shown).

Figure 2:
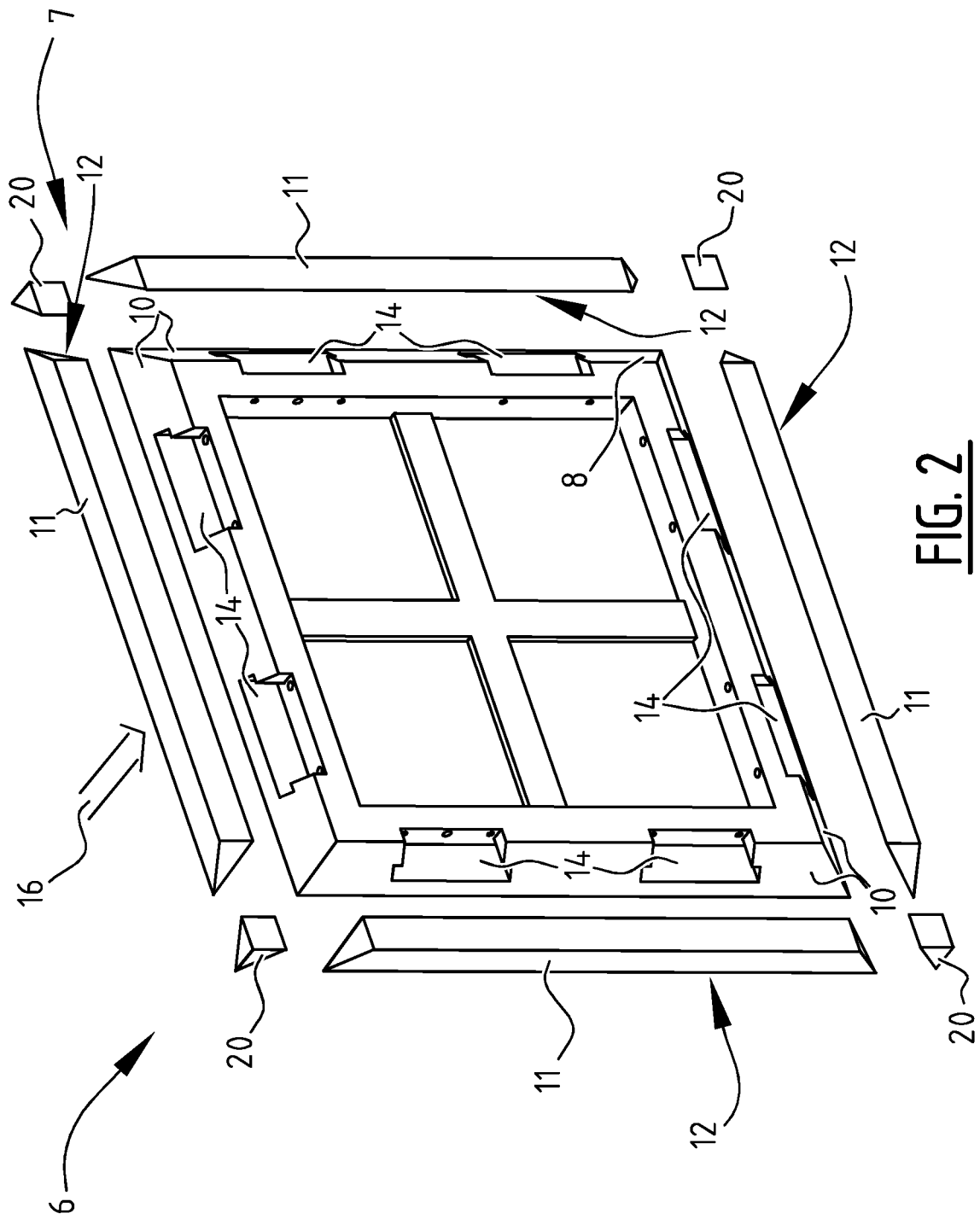
FIG. 2 is an exploded view of a tile element with LED screens according to an embodiment.

FIG. 2 shows a tile element 6 for constructing a modular construction. Tile element 6 comprises a chassis 7. Chassis 7 forms a frame whereby tile element 6 can be integrated in the modular construction. Chassis 7 can be connected to a chassis of another tile element for the purpose of forming the modular construction. Each chassis 7 is self-supporting and is provided to be connected, in the modular construction, to adjacent chassis of other tile elements to form a self-supporting modular construction. The mutually connected chassis of the different tile elements will here together form a support structure of the modular construction. No external structure or frame is hereby necessary to form the modular construction. This is described in more detail below. Chassis 7 is further also provided to integrate one or more LED screens 9 on a front side of the chassis so that a visible side 16 is formed by an LED screen. Visible side 16 is preferably rectangular.

An LED screen 9 is typically constructed with a plurality of colours of LEDs which are placed in a predetermined pattern relative to each other. Although this pattern is repetitive in practice, it is not necessarily symmetrical. Due to the asymmetry, the LED screen has a viewing direction. This means that the colours and/or intensity of the screen will differ depending on the viewing direction. By coordinating the LED orientation of adjacent tile elements with each other the viewing direction, and so the visual impression made by the screen, will be the same from one determined direction. This increases the visual uniformity of the visible side which extends over the tile element.

Chassis 7 has a base body 8 and a plurality of edge bodies 12. Base body 8 comprises first connecting side 10 adjacently of a peripheral edge of visible side 16. The first connecting sides 10 preferably run all around the whole peripheral edge of visible side 16. First connecting sides 10 extend at an angle relative to visible side 16. The angle is preferably an acute angle of about 45° relative to visible side 16. The angle is preferably an acute angle of a maximum of 45° relative to the visible side. It will be apparent to the skilled person here that when the angle is smaller than 45 degrees, for instance 30 degrees, two tile elements can still be placed with their visible sides substantially against each other at an angle of 90 degrees without the chassis preventing this. As further elucidated below, first connecting sides 10 can be connected to an edge body 11 or to a first connecting side of an adjacent tile element. The base body preferably has four first connecting sides 10. It will however be apparent to the skilled person that embodiments with more or fewer than four first connecting sides are also possible. Connecting sides 10 are each provided with at least one recess 14.

Chassis 7 further comprises edge bodies 12 which can be connected to base body 8. Where an edge body 12 is connected to base body 8, edge bodies 12 form a second connecting side 11. Second connecting side 11 extends substantially perpendicularly of visible side 16. The second connecting sides 11 preferably run all around the whole peripheral edge of visible side 16 when all edge bodies are connected to the base body. This allows the tile elements to be connected to each other so that their visible surfaces lie mutually in line, parallel to each other, and thus form one visual surface. This also allows the tile elements to be connected to an external frame wherein the visible side of the tile elements and the visible side of the external frame lie in the same plane. This allows an LED screen to be integrated in a surface of a modular construction in conventional manner with the tile elements according to the invention. Modifications need hereby be made neither to the frame nor to the tile element. This considerably increases the modularity of the construction.

Figure 6:
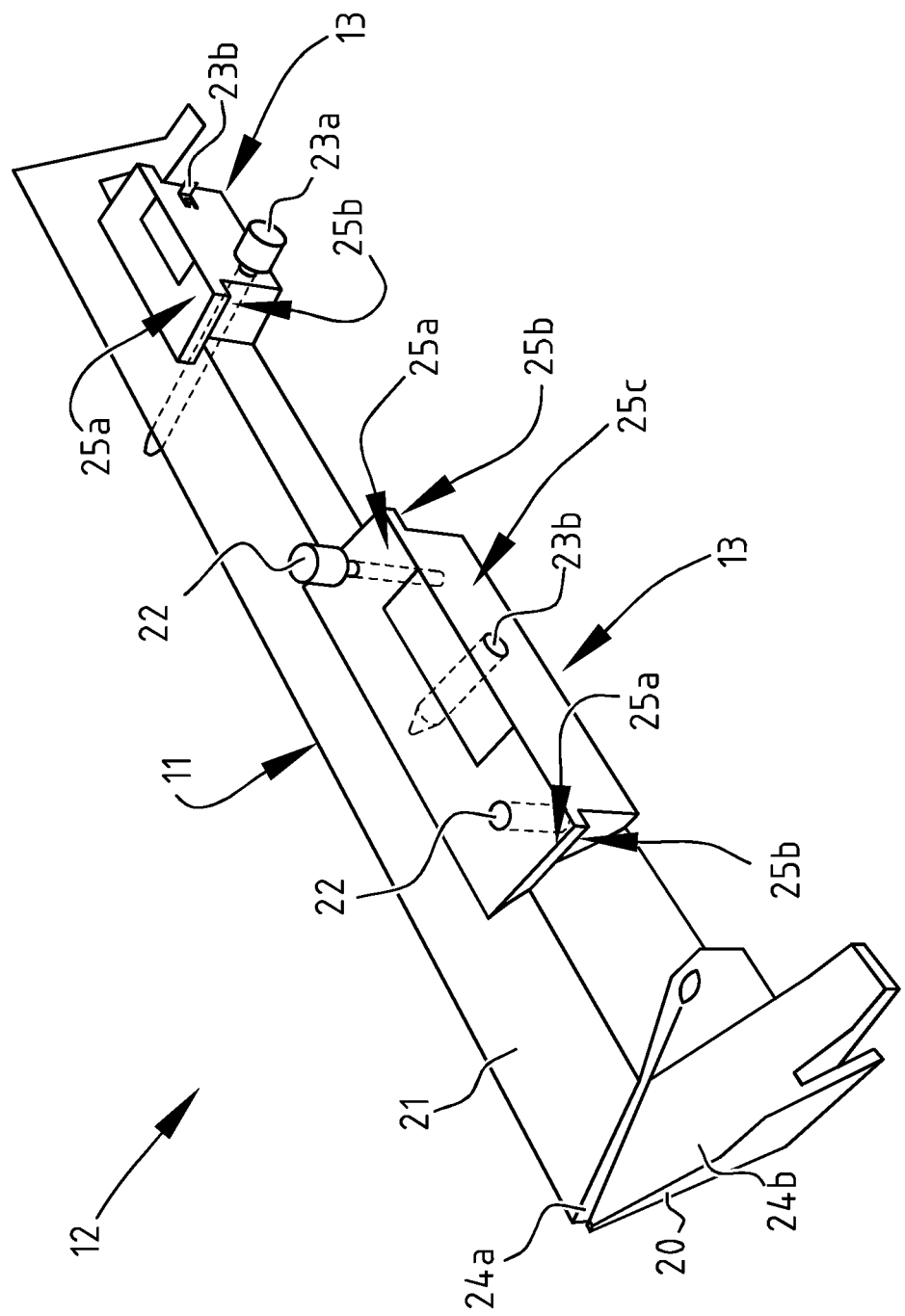
FIG. 6 is a perspective view of an edge body according to an embodiment.

Edge bodies 12 are configured to be connected to the first connecting sides 10. Each edge body 12 is provided for this purpose with at least one protrusion 13, as illustrated in FIG. 6. The at least one protrusion 13 is compatible with at least one recess 14 which is provided in the first connecting sides 10. An edge body 12 can hereby be connected in simple manner to a first connecting side 10 of base body 8. It will be apparent that edge body 12 can also be removed from base body 8.

The at least one recess 14 which is provided in each first connecting side 10*a-d* is configured to receive a compatible protrusion 13. When an edge body 12 is provided with such a protrusion 13, an edge body 12 can be connected to a first connecting side 10 of chassis 7. By providing the protrusions 13 and recesses at predetermined positions the edge bodies can be positioned in a predetermined position relative to the first connecting sides. In connected state the second connecting side 11 preferably intersects the first connecting side 10 substantially at the position of the visible side 16 when the edge bodies are in the predetermined position.

FIGS. 3A and 3B illustrate a cross-section of two tile elements 6*a*, 6*b* which are mutually connectable in alternative manner Tile elements 6*a*, 6*b* each respectively comprise at least one LED screen 9*a*, 9*b* which is arranged for the purpose of forming a respective visible side 16*a*, 16*b*. In the illustrated embodiment of FIG. 3A tile elements 6*a*, 6*b* comprise respective edge elements 12*a*, 12*c* and 12*b*, 12*d*. Edge elements 12*a-d* are connected to the first connecting sides of base body 8*a*, 8*b* of tile elements 6*a*, 6*b* and thus each form a second connecting side 11*a-c*. Tile elements 6*a* and 6*b* can thus be connected mutually in line. LED screens 9*a*, 9*b* run substantially parallel to a front surface of the respective tile elements 6*a*, 6*b*. A peripheral edge of LED screens 9*a*, 9*b* extends up to the second connecting side. The tile elements are preferably connected to each other such that the visible sides connect closely. Connect closely is understood to mean that an intermediate distance between LEDs of adjacent LED screens 9*a*, 9*b* does not differ appreciably from the intermediate distance of the LEDs within the same LED screen. The intermediate distance between LEDs of adjacent LED screens is preferably smaller than five times the intermediate distance of the LEDs within the same LED screen, preferably smaller than three times. Most preferably, the intermediate distance between LEDs of adjacent LED screens is equal to the intermediate distance of the LEDs within the same LED screen. This creates the impression that the LED screen runs continuously from the one to the other LED tile.

In an alternative embodiment, illustrated in FIG. 3B, the tile elements can be connected at an angle of substantially 90° relative to each other. This allows a 2D corner construction to be formed, the visible sides of which are oriented at 90° relative to each other. In FIG. 3B the edge bodies 12*a* and 12*b* are still connected to their base bodies 8*a*, 8*b*. The skilled person will appreciate that for the purpose of connecting these tile elements at the angle, the edge elements 12*a* and 12*b* must first be removed so that the tile elements can be placed with their first connecting sides against each other. In this position the visible surfaces of tile elements 16*a* and 16*b* will substantially come into contact with each other.

Figure 4:
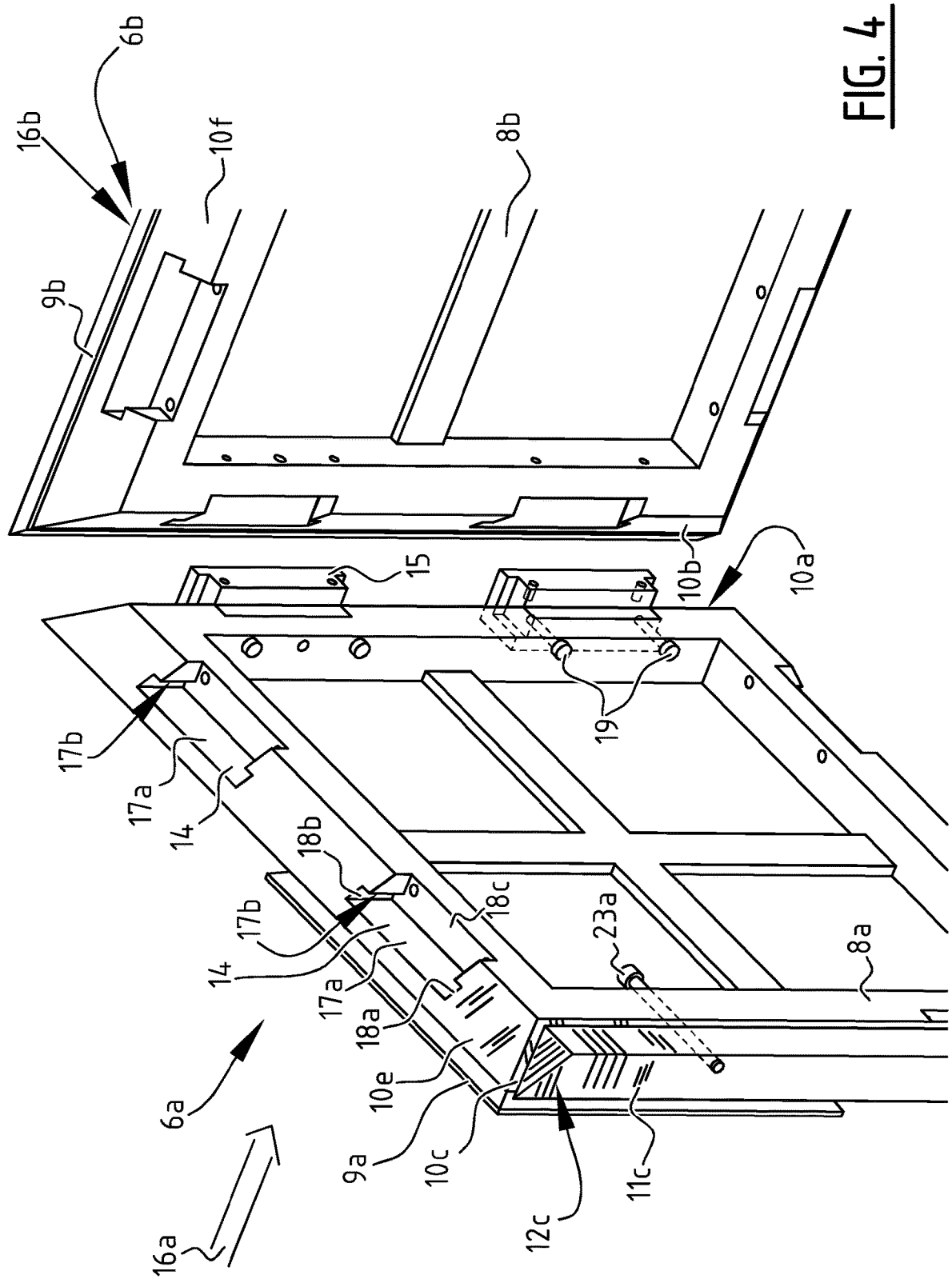
FIG. 4 is a perspective view of two tile elements forming a two-dimensional corner construction.
Figure 5:
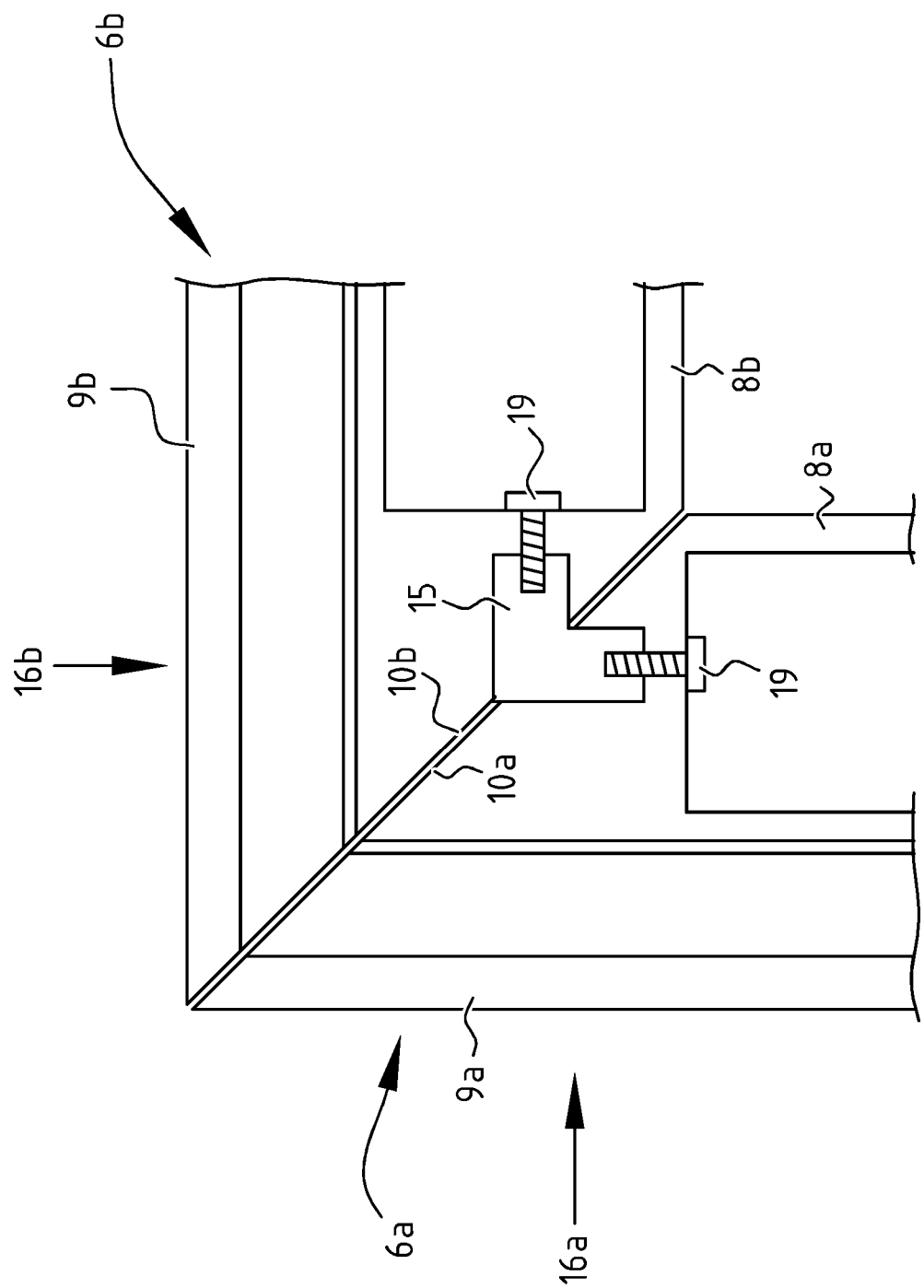
FIG. 5 is a cross-section of mutually connected tile elements.

In a preferred embodiment, illustrated in FIGS. 3B, 4 and 5, the peripheral edge of LED screens 9*a*, 9*b* is chamfered. This allows LED screens 9*a*, 9*b* to connect closely to each other when tile elements 6*a*, 6*b* are connected with their first connecting sides to each other. This embodiment is described at length hereinbelow. It will be apparent to the skilled person that not only a 2D corner construction can be formed in this way, but that a 3D corner construction can also be formed using a third tile element (not shown). The third tile element forms an angle of substantially 90° with both the first tile element 6a and the second tile element 6b. It will be apparent to the skilled person that in the illustrated embodiment of both FIGS. 3A and 3B further tile elements can be connected to the free second connecting sides 11c and 11d of tile elements 6a, 6b.

FIG. 4 illustrates a perspective view of two tile elements which form a 2D corner construction. FIG. 4 further illustrates the embodiment of FIG. 3B, wherein the tile elements 6a, 6b are connected to each other at the position of the first connecting sides 10a, 10b. For this purpose the edge bodies 12a, 12b of the respective tile elements 6a, 6b, illustrated in FIG. 3B, have been removed and are thus not shown.

FIG. 4 further illustrates first connecting sides 10c, 10e, 10f. An edge body 12c is connected to the first connecting side 10c. A second connecting side 11c is thus formed. For this purpose a further tile element (not shown) can be connected in line with tile element 6a, as for instance illustrated in FIG. 3A, for the purpose of forming a 1D construction surface.

The further connecting sides 10e, 10f of the respective tile elements 6a, 6b can be connected to a corresponding edge body (not shown) or can in an embodiment be connected to a further first connecting side of a further tile element (not shown) so that a 3D corner construction is formed.

FIG. 4 particularly illustrates that base body 8a comprises two recesses 14 in the first connecting side 10e. Recesses 14 each form a slot in which a protrusion 13 or a coupling element 15 can be arranged. The slot is formed such that it is compatible with the protrusion 13 and/or the coupling element 15. For this purpose the slot is provided with a first and a second stop surface 17a, 17b which are preferably substantially parallel to the visible side 16a of tile element 6a. The slot is further provided with a third and a fourth stop surface 18a, 18b which are oriented substantially transversely of the visible side 16 and of a longitudinal direction of the respective first connecting side 10e. The slot is preferably further provided with a fifth stop surface 18c which is substantially perpendicular to the visible side and is oriented in the longitudinal direction of the respective first connecting side 10. Stop surfaces 17a, 17b, 18a, 18b and 18c allow protrusion 13 and/or coupling element 15 to be displaceable in only one direction. The stop surfaces 17a, 17b parallel to visible side 16 prevent a movement of protrusion 13 or coupling element 15 in a direction transversely of visible side 16. The transverse stop surfaces 18a, 18b prevent a movement of protrusion 13 and coupling element 15 in a longitudinal direction of first connecting side 10e. The fifth stop surface 16c serves as a stop during the insertion of coupling element 15 or protrusion 13. In this way a coupling element 15 and/or the protrusion 13 can be arranged in simple, efficient and robust manner.

The embodiment illustrated in FIG. 4 shows that two recesses are provided in the first connecting side 10b of chassis 7. It will however be apparent that one or more than two recesses can also be provided. In other words, at least one recess 14 is provided in a first connecting side of chassis 7. The skilled person will appreciate on the basis of the above explanation that the simplest embodiment of the recess is a blind bore. This is because a blind bore has all the above described stop surfaces. The distance between the parallel stop surfaces 17a and 17b is preferably considerably smaller than the distance between the transverse stop surfaces 18a and 18b, so that an elongate recess is obtained.

Coupling element 15 or protrusion 13 is preferably fixedly connected to the base body 8 by means of coupling means 19. Coupling means 19 are preferably rapid couplings or screw connections. More specifically, the coupling means 19 are complementary components which can be operated, preferably in tool-free manner, to connect tile elements to coupling element 15 or to protrusions 13.

In FIG. 4 the first connecting side 10a is provided with a first coupling means. First coupling means 19 takes the form of a pin which can be provided with a handle and can be disposed in spring-loaded manner so that the pin can be moved manually and in relatively simple manner. The pin can optionally co-act with a slidable lock which is arranged on coupling element 15 and/or protrusion 13, so that the pin is lockable. This embodiment is described in more detail hereinbelow.

FIG. 4 further illustrates that the base body is provided with at least one tile connecting means 23a which extends substantially parallel to the visible side and through the first connecting side 10 and the corresponding edge body 12 for the purpose of connecting tile elements in line with each other. For this purpose the edge body can be provided with a throughfeed opening, wherein the throughfeed opening surrounds the connecting means. In an alternative embodiment edge body 12 can also comprise a cutout through which tile connecting means 23a extends along an adjacent wall of the edge body.

FIG. 5 illustrates a cross-section of mutually connected tile elements 6a, 6b which form a 2D corner construction. Tile elements 6a, 6b are connected to each other with their base bodies 8a, 8b via first connecting sides 10a, 10b by means of the coupling element 15.

Coupling element 15 is arranged in recess 14 of the first connecting side 10a of tile element 6a. Coupling element 15 is further arranged in the recess of the first connecting side 10b of the adjacent tile element 6b. It will be apparent that the recesses of the adjacent tile elements in which the same coupling element 15 is arranged are aligned relative to each other. It will be apparent that in the case that a plurality of recesses is provided in a first connecting side of a tile element, the plurality of recesses of the adjacent tile element in each case correspond with at least one of the plurality of recesses of the adjacent tile element. In this way all tile elements are interchangeable with and connectable to each other. This improves the modularity and the interchangeability of the tile elements.

Coupling element 15 is attached to base bodies 8a, 8b by means of coupling means 19. Coupling means 19 can for instance be a pin which co-acts with a slidable lock arranged on coupling element 15, as described above. The coupling means can for instance alternatively also be a screw and/or wing nut.

FIG. 5 further illustrates the close connection of LED screens 9a, 9b. For this purpose each peripheral edge of the LED screen is chamfered such that this peripheral edge runs parallel to or substantially coincides with the connecting surface of first connecting side 10a, 10b. Because the peripheral edges of each LED screen are chamfered and coincide with the connecting surface of first connecting side 10a, 10b, the peripheral edges of the LED screens connect closely when the adjacent tile elements are connected to each other. When forming a corner, this allows the visible surfaces 16a, 16b to connect closely at the position of the corner, whereby the impression is created of one continuously running screen which extends over the corner. This applies to both a 2D corner and to a 3D corner, and also when further corners are formed with such tile elements. A 3D corner construction can thus for instance be formed. The skilled person will appreciate that the impression is created in such an embodiment of one continuously running screen which extends over the two corners of the 3D corner construction.

FIG. 6 illustrates a perspective view of an edge body 12. Edge body 12 comprises two protrusions 13 and two corner bodies 20, only one of which is shown. The two protrusions 13 are arranged on an oblique side 21. The oblique side 21 of edge body 12 is compatible with a first connecting side of the base body. Protrusions 13 are formed such that they can be arranged in the recesses of a first connecting side of the base body. A protrusion is provided with contact surfaces 25a, 25b, 25c. The contact surfaces 25 are configured to lie against stop surfaces 17a, 17b of the slot when protrusion 13 is arranged in the slot, so that the freedom of movement of protrusion 13 is limited. Protrusions 13 can be formed integrally with edge bodies 12 but, in an alternative embodiment, can also be attached releasably to edge bodies 12. Because protrusions 13 are arranged on the oblique side of edge body 12 and the protrusions can only be arranged in the recesses in one direction, the edge bodies can be connected to a chassis in efficient manner. This saves time when building a construction. In the embodiment shown in the figures the one direction for arranging the protrusions in the recesses lies parallel to the surface of the screen. The skilled person will appreciate that the recesses and protrusions can also be oriented differently, such that edge bodies can be connected to the base body in other directions. A further embodiment can thus be envisaged wherein the direction for arranging the protrusions in the recesses is perpendicular of the surface of the screen. This would even allow the edge bodies to already be connected to each other or to be at least partially integrally formed, and to be mounted on the base body as a whole, in one movement.

An edge body 12 and/or a protrusion 13 thereof can be provided with complementary tile connecting means 23a, which tile connecting means allow tile elements to be connected to each other when the second connecting sides lie against each other. Edge body 12 and/or a protrusion thereof can be provided with at least one blind bore 23b, which is complementary with the tile connecting means of an adjacent tile. Blind bore 23b is configured to receive the complementary tile connecting means 23a. In such a preferred embodiment the tile connecting means 23a is preferably a pin as described in FIG. 4. In such an embodiment blind bore 23b is preferably provided with a slidable lock which is mounted on the base body of tile element 6 and is configured to engage tile connecting means 23a such that the adjacent tile elements are fixedly attached to each other. This increases the convenience of use. Blind bore 23b can optionally be threaded if the tile connecting means is for instance a screw or bolt. The complementary connecting means allow an extremely rapid and simple assembly and disassembly. The skilled person will appreciate that other embodiments of tile connecting means can be provided in order to achieve the above described advantages and effects therewith.

The first connecting sides and the edge bodies further comprise corresponding connecting means 22 for connecting the edge body to the base body. The connecting means are preferably similar to the tile connecting means.

The edge bodies further comprise connecting means for connecting a finish to a rear side of the tile element. The finish is for instance a plate or a cloth. For mounting of the cloth the rear side is provided on a periphery with a groove. This groove is provided in the edge bodies and in the corner bodies discussed below. By providing the groove in edge bodies and corner bodies, the groove can continue round the whole periphery of the tile when the tile is provided with the edge bodies and corner bodies.

Edge body 12 is further provided at the outer ends thereof with corner bodies 18. A chassis 7, each first connecting side 10 of which is connected to an edge body, forms a beam-like frame. Adjacent tile elements can hereby be connected mutually in line. Each edge body has a first and a second outer end at the position of a corner of the chassis. At the position of each corner two outer ends of two edge bodies are mutually adjacent. At the position of each corner of the base body is situated a corner body 20. Corner body 20 is connected on two sides to one of the outer ends of an edge body. In other words, two adjacent edge bodies share a joint corner body 20. Corner body 20 is connected releasably to each of the edge bodies. In a preferred embodiment this coupling can be embodied in similar manner as the protrusion of the edge body with the chassis. A recess can for this purpose be provided in the edge body, which recess corresponds with a protrusion provided on corner body 20. An alternative embodiment wherein a recess is provided in corner body 20 and a protrusion is provided on the edge body is also possible. Such embodiments allow an extremely rapid and simple assembly and disassembly of corner body 20. Alternatively, the corner body can also be connected by means of a screw connection.

Corner body 20 comprises a first and a second surface 24a, 24b, such that in a mounted position the first surface lies parallel to the first connecting side and a second surface lies parallel to the second connecting side. In an embodiment wherein a 2D corner construction is formed the two corner bodies and the corresponding edge elements on the first connecting sides which are connected to each other are detachable. The first connecting sides are hereby connectable along their whole longitudinal direction. It will be apparent to the skilled person that, both in the case of a 2D or a 3D corner construction, a further free side thereof can be connected to for instance a second connecting side of a 1D construction. Because a selection can be made of corner bodies which can be connected and/or removed, it is possible to use the tile element in a straight surface, a 2D corner, a 3D corner, a pillar, a cube and so on. A tile element with an LED screen is thus provided whereby corners can be formed in simple manner and which has a further improved modularity. A further advantage of the corner body is that it improves the stability of the modular construction and strengthens the connection during forming of 1D constructions. This allows the tile elements to be utilized in construction systems in a highly flexible manner.

Figure 7:
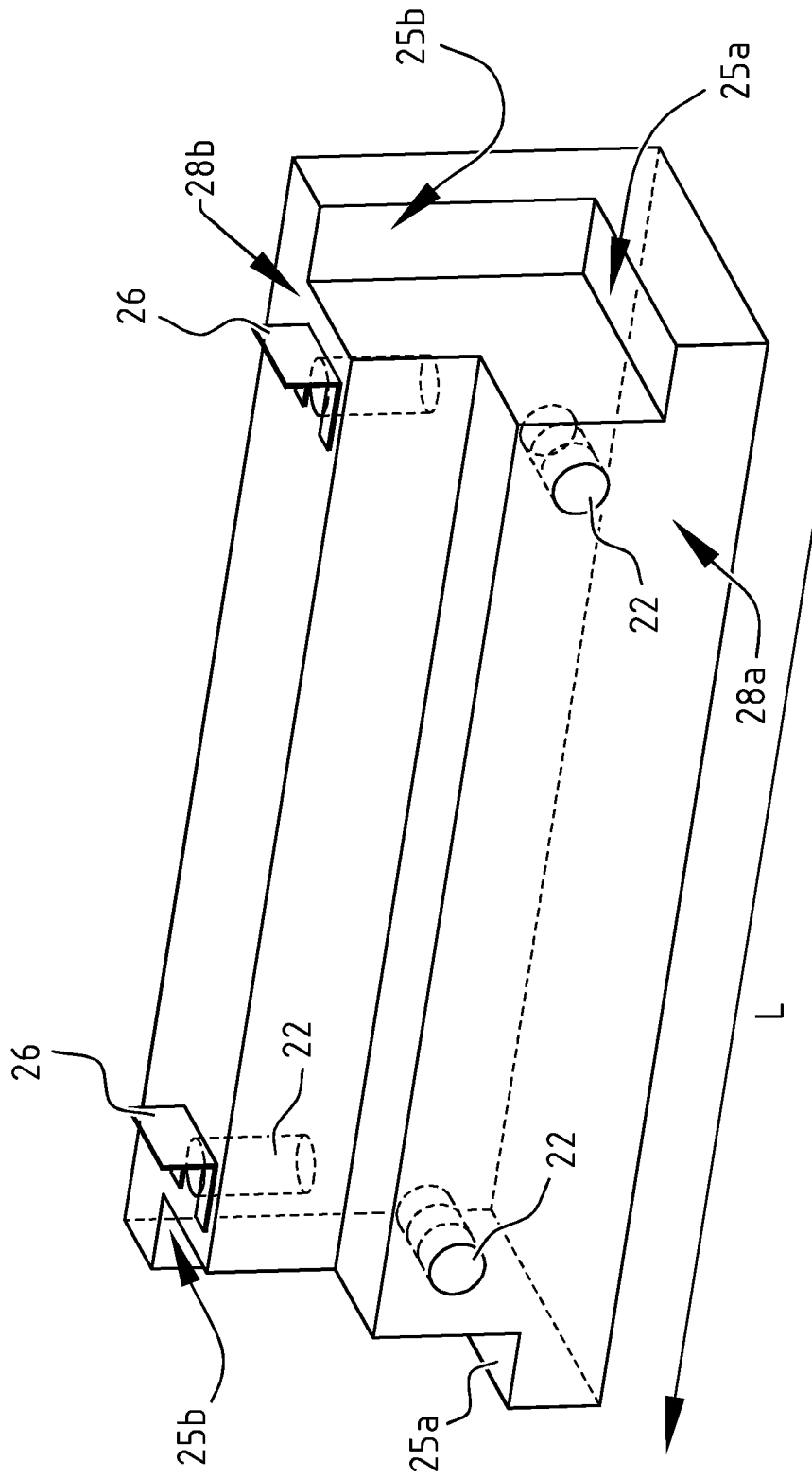
FIG. 7 is a perspective view of an embodiment of a coupling element.

FIG. 7 illustrates a perspective view of an embodiment of a coupling element 15. Coupling element 15 is formed by placing two protrusions at an angle of 90° relative to each other. In other words, the coupling element is provided with two arms or protrusions extending substantially perpendicularly relative to each other. Corner surfaces 28a, 28b, which lie perpendicularly relative to each other, are in this way formed on an outer side of the coupling element. When coupling element 15 is arranged, the corner surfaces will be adjacent to a parallel stop surface 17a of recess 14.

The coupling element is provided at the outer ends, as seen in the longitudinal direction L, with protruding contact surfaces 25a, 25b. Contact surfaces 25a, 25b are configured to co-act with the stop surfaces 17b of the slot when the coupling element is arranged in a recess, so that coupling element 15 is positioned fixedly in the recesses. As a result, the coupling element can only be arranged in the recess in one direction. The orientation of the coupling element is hereby also predetermined. A further tile element can thus be placed adjacently of the coupling element, but can only be connected in one direction to the coupling element. The adjacent tile elements are hereby connected at an angle of 90° relative to each other when they are connected to each other, since the corner surfaces and the parallel stop surfaces 17*a* limit the freedom of movement.

FIG. 7 further illustrates that blind bores 22 can be provided for the purpose of connecting coupling element 15 to the base body via connecting means (not shown). For this purpose the blind bore can be provided with a screw thread in the case that the connecting means take the form of a screw or bolt. As indicated, blind bore 22 can also be provided with a slidable lock 26. The slidable lock can co-act with for instance a pin which is arranged on the chassis, such that the pin is lockable. The connecting means limits the freedom of movement of coupling element 15 further so that it is connected fixedly to the chassis. In other words, the connecting means prevents coupling element 15 from being removable from the slot. Coupling element 15 is thus mounted on a chassis in simple and robust manner.

When coupling element 15 is fixed in the tile element via a connecting means, the coupling element and the tile element are connected to each other in robust manner. Coupling element 15 further allows the tile elements to be assembled and disassembled in extremely rapid and simple manner.

The embodiment in FIG. 7 is symmetrical, whereby it can be mounted in the slot in two ways. The skilled person will appreciate that the tile elements will always form an angle of substantially 90° relative to each other owing to the symmetry of coupling element 15. Time is hereby saved when building the construction system.

The skilled person will appreciate on the basis of the above description that the invention can be embodied in different ways and on the basis of different principles. The invention is not limited to the above described embodiments. The above described embodiments and the figures are purely illustrative and serve only to increase understanding of the invention. The invention will not therefore be limited to the embodiments described herein, but is defined in the claims.

The invention claimed is:

1. A tile element for constructing a modular construction, the tile element comprising:
    a chassis with a base body which has a visible side which is provided substantially wholly with an LED screen, wherein the base body comprises first connecting sides adjacently of a peripheral edge of the visible side, wherein the first connecting sides are disposed at an acute angle relative to the visible side; and
    a plurality of edge bodies removably coupled to the base body in order to form, where each edge body is connected, a second connecting side which is disposed substantially perpendicular relative to the visible side, wherein the first connecting sides are disposed continuously around the whole peripheral edge of the visible side and wherein the second connecting sides are disposed continuously around the whole peripheral edge of the visible side when all edge bodies are connected to the base body,
    wherein the edge bodies cover the first connecting sides of the base body when all edge bodies are connected to the base body, and
    wherein each of the plurality of edge bodies comprises complementary tile connecting means, which tile connecting means allow tile elements to be connected directly to each other when second connecting sides lie against each other.

2. The tile element according to claim 1, wherein the visible side is rectangular and wherein the chassis comprises four edge bodies which can each be connected to a peripheral edge of the rectangular visible side.

3. The tile element according to claim 1, wherein tile connecting means allow tile elements to be connected directly to each other to form a self-supporting modular construction.

4. The tile element according to claim 1, wherein the first connecting sides have recesses which are compatible with protrusions on each of the edge bodies so as to position each of the edge bodies at a predetermined position relative to the first connecting sides.

5. The tile element according to claim 4, wherein in the predetermined position the second connecting side intersects the first connecting side substantially at the position of the visible side.

6. The tile element according to claim 1, wherein the first connecting sides and the edge bodies each comprise connecting means to connect each of the edge bodies to the base body.

7. The tile element according to claim 1, wherein the tile element further comprises corner bodies which can be connected to the base body between adjacent edge bodies.

8. The tile element according to claim 7, wherein each corner body is formed with a first surface and a second surface, such that in a mounted position the first surface lies parallel to the first connecting side and a second surface lies parallel to the second connecting side.

9. The tile element according to claim 1, wherein the tile connecting means comprise on one side a pin with a handle and on the other side a lock in which the pin engages in order to connect adjacent tile elements to each other without tools.

10. The tile element according to claim 1, wherein each of the edge bodies comprise connecting means in order to connect a finish to a rear side of the tile element.

11. A modular construction, comprising at least two tile elements according to claim 1, wherein the modular construction further comprises a coupling element which is connected to first connecting sides of each of two tile elements in order to couple the tile elements, wherein the visible sides of the respective tile elements lie at an angle relative to each other.

\* \* \* \* \*

UNITED STATES PATENT AND TRADEMARK OFFICE
CERTIFICATE OF CORRECTION

PATENT NO. : 12,288,487 B2
APPLICATION NO. : 17/769065
DATED : April 29, 2025
INVENTOR(S) : Michiel Lesage Page 1 of 1

It is certified that error appears in the above-identified patent and that said Letters Patent is hereby corrected as shown below:

On the Title Page

Item (71), Under Applicant, "Deinze" should be --Kortrijk--.

Signed and Sealed this
Third Day of June, 2025

Coke Morgan Stewart
*Acting Director of the United States Patent and Trademark Office*